Feb. 3, 1970     P. J. SCAGLIONE     3,493,008
PRESSURE BALANCED REGULATING VALVE
Filed Oct. 10, 1966     2 Sheets-Sheet 1
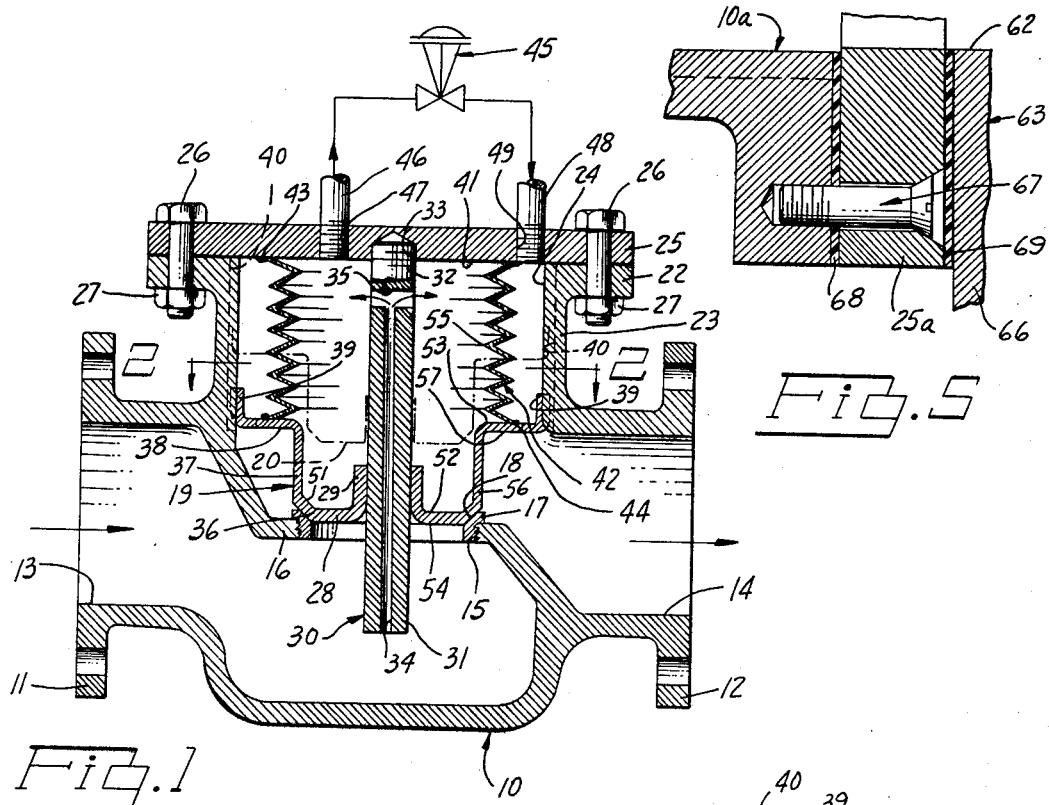
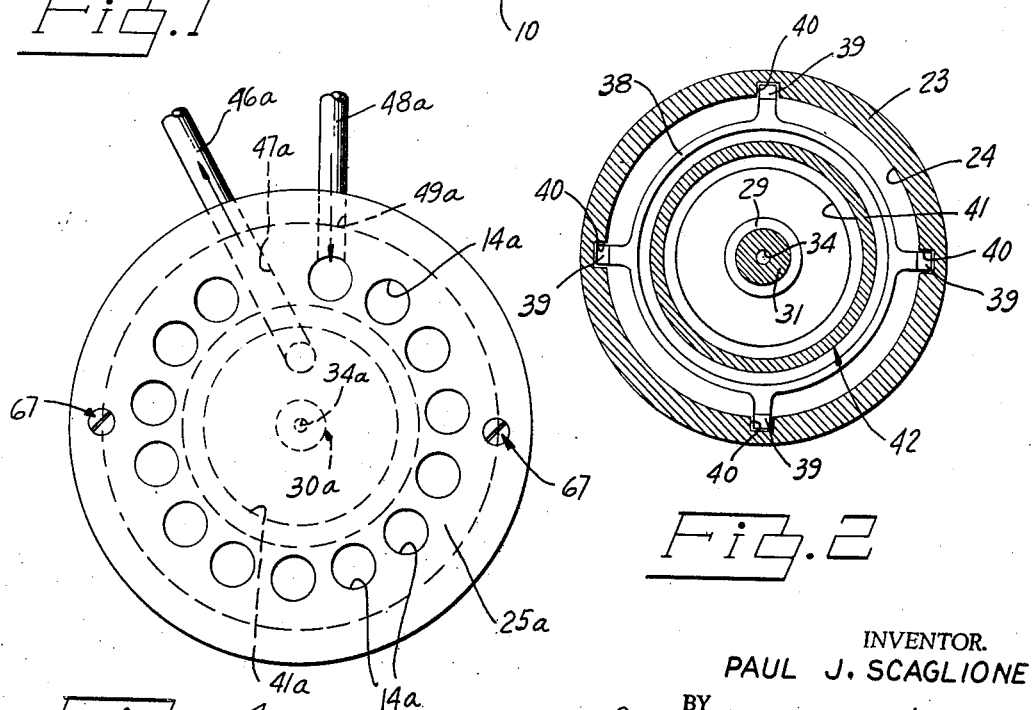
INVENTOR.
PAUL J. SCAGLIONE
BY
Donnelly, Mentag & Harrington
ATTORNEYS

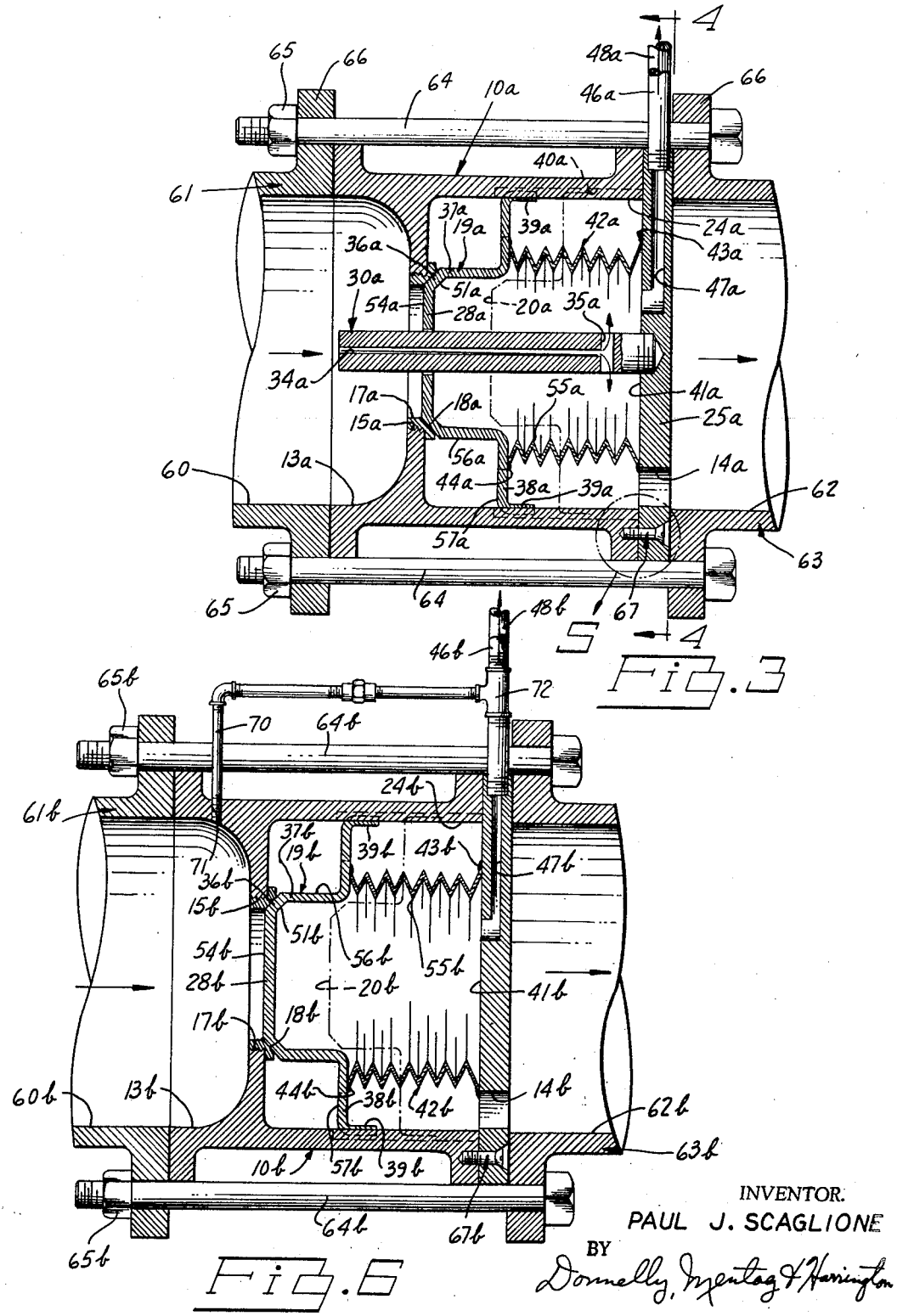

United States Patent Office 3,493,008
Patented Feb. 3, 1970

3,493,008
PRESSURE BALANCED REGULATING VALVE
Paul J. Scaglione, 30180 Richmond Hill Drive,
Farmington, Mich. 48024
Filed Oct. 10, 1966, Ser. No. 585,522
Int. Cl. F16k 31/143; G05d 27/00
U.S. Cl. 137—219                              8 Claims

ABSTRACT OF THE DISCLOSURE

A pressure balanced regulating valve capable of providing two stages of flow in one regulating valve structure. One stage provides low flows and, as the flow demand increases, the second or larger stage flow automatically comes into operation.

---

This invention relates generally to the valve art, and more particularly, to a novel and improved pressure balanced regulator valve.

In many fluid flow systems, it is necessary to provide two stages of flow, as for example, in a system for conveying steam for heating purposes it is necessary to have a first-stage or flow for the summer load and a second-stage or flow for the winter load. Heretofore, attempts have been made to provide the required two stages of flow in such systems by the use of one valve. In two-stage systems where one valve is used, difficulty is encountered in the first-stage because of the large pressure differential across the valve seat whereby when the valve lifts off of its seat a short distance it slams back and closes because it overshoots the load requirement and a chattering of the valve results. In order to overcome such a problem, the prior art two-stage systems have commonly used two valves in a parallel arrangement in the system. That is, a small valve is used for the summer load or first-stage, and a large valve is used for the winter load or second-stage. A disadvantage of such a two-valve system is that such a system is costly and does not function automatically since it requires a specific manual shutting-off of one valve and turning-on of the other valve, or elaborate external electric or pneumatic control systems for automatic operation. Also, each of the two valves for a two-stage flow system, at times, requires a separate pilot valve.

In view of the foregoing, it is an important object of the present invention to provide a novel and improved pressure balanced regulating valve which is adapted to provide two stages of flow through a single valve and overcome the aforedescribed disadvantages of the prior art valves.

It is another object of the present invention to provide a two-stage valve capable of controlling the flow of fluid for low and high loads in a fluid flow system, as in a steam heating system, and which is adapted to function automatically without the need for a manual or exotic external controls to change from the first-stage to the second-stage and which is further adapted to accomplish such function without chattering, and in a better controlled and more economical manner as compared to the aforementioned prior art two-stage valve structure.

It is still another object of the present invention, to provide a novel and improved pressure balanced regulating valve structure which provides two stages of flow through the valve structure, and which includes a pilot valve that actuates the raising and lowering of the valve member and which becomes part of the first phase of the flow system through the valve structure.

It is a further object of the invention to provide a pressure balanced regulating valve for providing two stages of fluid flow in a fluid flow system which includes a valve body provided with an inlet passage and an outlet passage, said passages being separated by a wall having a valve opening, with a valve seat around said opening for communicating said inlet passage with said outlet passage, a cup shaped valve member mounted in said outlet passage and movable between a closed position in seating engagement with said valve seat and an open position spaced apart from said valve seat to allow flow of fluid from the inlet passage to the outlet passage, said cup shaped valve member having a front end engageable with said valve seat and a rear end spaced longitudinally from said front end and provided with an annular outwardly extended flange, a hermetically sealed bellows in said valve body having one end fixed and the other end attached to the rear face of the flange on the rear end of said cup shaped valve member so as to enclose an internal transverse face area of the valve member which is larger than the external face area on the front end of the valve member that is exposed to the inlet passage through the opening in said wall, a pilot valve, a first fluid conduit means communicating said inlet passage with the interior of said bellows and one side of said pilot valve, and, a second fluid conduit means communicating said outlet passage with the other side of the pilot valve and having a flow capacity larger than the flow capacity of said first fluid conduit means.

Other objects, features and advantages of this invention will be apparent from the following detailed description, appended claims, and the accompanying drawings.

In the drawings:

FIG. 1 is an elevational section view of a first embodiment of a pressure balanced regulating valve made in accordance with the principles of the present invention;

FIG. 2 is a horizontal section view of the structure illustrated in FIG. 1, taken along the line 2—2 thereof, and looking in the direction of the arrows;

FIG. 3 is an elevational section view of a second embodiment of a pressure balanced regulating valve made in accordance with the principles of the present invention, and showing the valve connected in a pressurized fluid flow system;

FIG. 4 is an elevational view of the valve structure shown in FIG. 3, taken along the line 4—4 thereof, with parts removed, and looking in the direction of the arrows;

FIG. 5 is a fragmentary, enlarged view of the structure shown in FIG. 3, taken within the circle marked by the numeral 5; and, FIG. 6 is an elevational section view of a third embodiment of a pressure balanced regulating valve made in accordance with the principles of the present invention.

Referring now to the drawings, and in particular to FIG. 1, the numeral 10 generally designates the valve body of a first embodiment of a pressure balanced regulating valve made in accordance with the principles of the present invention. The body 10 is shown as being shaped in accordance with a standard type globe valve for purposes of illustration. The valve body 10 is provided with a pair of flanged end connection members 11 and 12, by means of which the valve is bolted into a pressurized fluid flow system, as for example a steam supply or water supply system. It will be understood that the valve body 10 may be provided with screwed end connections, if desired.

The valve body 10 is provided with an inlet passage 13 which represents the high pressure side of the valve, and with an outlet passage 14 which represents the low pressure side of the valve. The inlet passage 13 is connected to the outlet passage 14 by means of an opening 15 which is formed in the horizontal dividing wall 16. Threadably mounted in the opening 15 is an annular member 17 which has a conical valve seat 18 formed around the inner periphery thereof.

The flow of fluid under pressure from the inlet passage 13 to the outlet passage 14 is regulated by the raising d lowering of a disc cup or valve, generally indicated the numeral 19. The solid line position of the disc p 19 in FIG. 1 illustrates the closed position of the lve 19, and the fully opened position of the disc cup 19 shown by the broken line position marked 20. The ic cup 19 will move from the closed position to the lly opened position 20 in accordance with the flow reirements exerted on the valve.

As shown in FIGS. 1 and 2, the valve body 10 inides the upwardly extended cylindrical wall 23 which rms a low pressure chamber 24 that is disposed in ncentric alignment with the disc cup 19. The low essure chamber 24 communicates with the low pressure tlet passage 14. The outer end of the low pressure amber 24 is enclosed by an end plate 25 which is ured to an integral flange 22 disposed around the ter end of the chamber wall 23, by a plurality of bolts and nuts 27.

As best seen in FIG. 1, the disc cup or valve 19 inides a horizontal end plate or wall 28, through the nter of which is formed a guide hole surrounded by integral sleeve or collar alignment guide member 29. idably mounted through the guide sleeve 29 is a sensing ide probe generally indicated by the numeral 30. The obe 30 comprises an elongated body in the form of a lindrical rod 31 through which is formed a longidinally extended bore 34 that communicates at the iter end thereof with the high pressure inlet passage 13 id at the inner end thereof with a transverse bore 35 at communicates with a high pressure chamber, as ore fully explained hereinafter. The probe body 31 is ovided with a threaded inner end 32 which is threadily mounted in a hole 33 formed in the inner face of e end plate 25.

The disc cup or valve 19 further includes the integral rcular seat portion 36 which is integral with the end ate 28 and which has a conical outer face adapted to be ated on and mate with the conical valve seat 18, when e disc cup or valve 19 is in the closed position of IG. 1. The disc cup 19 further includes a cylindrical dy 37 which has its lower end integrally connected to e valve seat portion 36, and it upper end connected to flange 38 that extends perpendicularly outward from e body 37, toward the wall 23 of the low pressure amber 24. The disc cup 19 is provided with a plurality radially spaced integral guide arms 39 which have a ortion slidably mounted in mating, longitudinally exnded slots 40 formed in the inner surface of the chamber all 23, as shown in FIG. 2.

As best seen in FIG. 1, a high pressure chamber 41 is ormed within the low pressure chamber 24 by a metallic ermetically sealed, flexible type bellows 42. The bellows 2 has its outer end sealed by any suitable means, as by elding, as indicated by the numeral 43, to the inner side r face of the end plate 25. The inner end of the bellows 2 is secured to the outer face 53 of the disc cup flange 8 by any suitable means, as by welding as indicated y the numeral 44. The transverse bore or passage 35 the probe body 31 discharges fluid under pressure from e high pressure passage 13 into the chamber 41. It ill be seen, that the sensing guide probe 30 also funcons as an alignment guide for the disc cup 19, so that will always seat itself properly on the seat 18 as the isc cup 19 travels between the closed position and the pen position indicated by the broken line 20 in FIG. 1.

The position of the disc cup 19 is determined by any uitable standard pilot valve, generally indicated by the umeral 45 in FIG. 1. The pilot valve 45 may be adapted or pressure control, temperature control or a combinaon of both. As shown in the illustrative embodiment of IG. 1, the pilot valve 45 receives its signal from the igh pressure chamber 41 and the low pressure chamber 4. The high pressure chamber 41 is connected to one ide of the pilot valve 45 by a suitable conduit 46 which as its inner end threadably mounted in the threaded hole or bleedport 47 which communicates with the chamber 41. The other side of the pilot valve 45 is connected by a suitable conduit as 48 to a threaded bleedport 49 which communicates with the low pressure chamber 24.

The operation of the pressure balanced regulating valve illustrated in FIGS. 1 and 2 will be described by assuming that the valve is connected in a pressurized fluid flow line and that the disc cup or valve 19 is in the closed position, or solid line position shown in FIG. 1. The high pressure fluid in the inlet passage 13 cannot flow directly into the low pressure outlet passage 14 because of the following described action. The high pressure fluid enters the longitudinal bleed passage 34 in the sensing guide probe 30 and passes through the bleed passage 35 into the high pressure chamber 41. The disc cup 19 is designed so that it will accumulate a greater counter internal force against the valve seat 18 than the initial force in the high pressure passage 13 which is acting on the disc cup 19 with a tendency to push the disc cup 19 away from the seat 18. This holding action of the disc cup 19 on the seat 18 is accomplished by the fact that the combined internal areas of the internal face 52 on the end wall 28, internal face 51 on the conical seat portion 36, and the internal face 53 of the flange 38 is greater than the area of the outer face 54 of the end wall 28 which is exposed to the high pressure passage 13, thereby creating a greater internal force operating to hold the disc cup 19 on the seat 18 than the external force in the passage 13 which maintains a force trying to move the disc cup 19 to the open position 20. For example, assuming the area of the outer face 54 of the disc cup end wall 28 to be equal to a hundred square inches, and the pressure of the fluid in the high pressure passage 13 to be fifty pounds per square inch, gage pressure, the force acting against the outer face 54 would be fifty times a hundred, or five thousand pounds force. Assuming that the internal area of the inner face of the end wall 28 and the conical portion 36 is equal to one hundred and ten square inches plus the internal assumed face area 53 of the flange 54 to be fifty square inches, the total internal square inches would be one hundred and ten plus fifty, which equals one hundred and sixty square inches. The internal force acting on the disc cup 19 would then be one hundred and sixty square inches times fifty pounds per square inch, gage pressure, which would be equal to an eight thousand pound force acting to hold the disc cup 19 on the seat 18. This is three thousand pounds greater than the external force acting on the end wall outer face area 54, which is five thousand pounds.

As shown in FIG. 1, the bellows 42 is designed and connected to the flange 38 of the disc cup 19 so that the inner end 55 of the folds of the bellows are disposed concentric with the outer diameter 56 of the wall 37 of the disc cup 19, but radially inward of the thickness of the bellows material. The lower end of the bellows 42 which is connected at the point 44 on the upper side of the flange 38 thus permits the lower pressure in the chamber 24 to act on the outer surface of the lower fold of the bellows 42 and the outer exposed portion of the upper surface of flange 38 so as to provide an external force acting on the disc cup 19 which will be equal to the external force acting on the lower side of the flange 38, as viewed in FIG. 1, so that the forces will be equalized at the lower face 57.

In the aforementioned illustrative example, it has been assumed that the pressure in the low pressure passage 14 is to be maintained at ten pounds per square inch, gage pressure. Assuming that this pressure drops, then this pressure in the low pressure passage 14 will act on the pilot valve 45 through the low pressure chamber 24 and the conduit 48. This pressure drop will cause the pilot valve 45 to open, thus allowing high pressure fluid to flow from the high pressure chamber 41 and through the bleed passages 35 and 34 and the high pressure inlet passage 13. This flow of pressurized fluid represents the first-stage flow for low pressure or low flow loads. The bleed passages or conduits 46 and 48 are each greater in area than the bleed passage 34 in the probe 30 so that the disc cup 19 will remain in the closed position as long as flow through the bleed passage 46 does not exceed the flow from the passage 34. This flow differential will handle extreme low flows of pressurized fluid through the first-stage supply by way of the second-stage high pressure chamber 41.

Assuming that the pressure in the low pressure passage or outlet 14 drops beyond the point of the first-stage's supply, then the flow of fluid under pressure from the supply chamber or high pressure chamber 13 through the bleed passage 34 will be greater than the flow of fluid from the low pressure chamber 24, and the flow from the high pressure chamber 41 through the bleed passage conduit 46 will be greater than that which is supplied by the smaller bleed passage 34. The last mentioned differential in flow will cause the pressure in the high pressure chamber 41 to be reduced to a point where it can no longer provide a closing force sufficient to resist the opening force acting on the high pressure side face 54 on the disc cup 19. The force acting on the outer face 54 will raise the disc cup 19 from the solid line position shown in FIG. 1 to the broken position indicated by the numeral 20, thus allowing the second-stage or large internal flow of fluid to pass from the high pressure passage 13 into the outlet passage 14. At this point in the operation of the valve there is now flow from both the first and second stages passing into the outlet passage 14.

The flow of pressurized fluid through both stages of the valve continues until the low pressure system which is being supplied by the valve has been satisfied. The pressure in the low passage 14 will rise to its presumed pressure of ten pounds per square inch, gage pressure, and when this pressure is reached it will act on the pilot valve 45 through the bleed passage 48 to cause the pilot valve 45 to start closing. The closing of the pilot valve 45 commences a throttling action on the first-stage flow through the bleed passage 46. As flow of pressurized fluid through the bleed passage or conduit 46 diminishes to less than what is being supplied through the smaller bleed passage 34 in probe 30, the pressure in the high pressure chamber 41 starts to build up. As the pressure in the high pressure chamber 41 comes to the full preset pressure it will commence closing the disc cup 19, and move it from the broken line position 20 in FIG. 1 to the solid line closed position shown in FIG. 1. As the disc cup 19 begins to close, the full pressure on the lower face 54 will not be the same as on the lower face 57 of the disc cup flange 38, because of the disc cup cylindrical body portion 37 which spaces the flange 38 apart from the disc cup bottom wall 28 so that the main pressure will be passed to the low pressure system before reaching the lower face 57 on the flange 38. As the high pressure shoots up towards the flange surface 57 it will adjust to the low pressure in the passage 14 and will have no effect on the flange 38. This action will allow the full force inside the pressure chamber 41 to act on the inner face 53 of the flange 38 and that force added to the force on the internal face 52 of the wall 28 and the face 51 of the conical portion, will, as previously described, overcome the force acting on the lower face 54, thereby closing the disc cup or valve 19 and stopping all flow.

It will be seen that the valve illustrated in FIGS. 1 and 2 needs no springs or diaphragms, and that it employs a bellows and a novel disc cup valve which provides a larger inside face area acting against the valve seat than the face area exposed to the high pressure side of the valve. By its own internal force, the valve will maintain a tight shutoff condition against its seat 18, because the combined internal face area of the disc cup 19 and the flange 38 is greater than the exposed area on the inlet passage side of the disc cup 19. In the closed position, the pressure inside of the high pressure chamber 41 is equal to the pressure exerted on the face 54 of the disc cup wall 28. This condition exists because of the bleed passages 34 and 35 which communicate the inlet passage 13 with the high pressure chamber 41. It will be seen that the low pressure forces acting on the faces of the flange 38 are balanced off on each side so as not to introduce any additional forces which have to be compensated for during the operation of the valve.

FIGS. 3, 4 and 5 illustrate a second embodiment of a pressure balanced regulating valve made in accordance with the principles of the present invention. The parts of the second embodiment which are the same as the parts of the first embodiment have been marked with the same reference numerals followed by the small letter *a*. The main difference between the second embodiment and the first embodiment of FIGS. 1 and 2 is that the second embodiment is made with the sensing guide probe 30*a* disposed in axial alignment with the direction of flow of the fluid flow system in which the valve is incorporated.

As shown in FIG. 3, the valve body 10*a* is provided with a high pressure inlet passage 13*a* which is connected to the interior 60 of a pressurized fluid supply conduit 61. The low pressure chamber 24*a* communicates through a plurality of outlet passage ports or holes 14*a* with the interior 62 of a fluid supply conduit 63. The valve body 10*a* is substantially cylindrical in overall configuration and is adapted to be connected between the fluid system conduit 61 and 63 by any suitable means, as by a plurality of bolts 64 and nuts 65 which are operatively mounted through the usual flanges 66 formed on said fluid conduits. As shown in FIG. 4, the outlet passage ports or holes 14*a* are formed through the end plate 25*a*. In the embodiment of FIGS. 3, 4 and 5, the end plate 25*a* is secured to the valve body 10*a* by any suitable means, as by a plurality of screws 67 of the type illustrated in FIG. 5. A suitable gasket 68 is disposed between the valve body 10*a* and the end plate 25*a*. A suitable sealing means 69 is also disposed between the end plate 25*a* and the flange 66 of the conduit 63.

As shown in FIG. 3, the bleed passage 47*a* is formed in the end plate 25*a*, and the bleed conduit 46*a* for connecting the high pressure chamber 41*a* to the pilot valve 45 is threadably mounted in the outer end of the passage 47*a*. As shown in FIG. 4, the bleed conduit 48*a* for connecting the low pressure chamber 24*a* to the pilot 45 is connected to the bleed passage 49*a* which is also formed through the end plate 25*a* and which communicates with one of the outlet passages 14*a*.

The valve illustrated in FIGS. 3, 4 and 5 functions in the same manner as the first embodiment of FIGS. 1 and 2 to provide a two-stage pressure balanced regulator valve. This second embodiment of the invention illustrates that the invention may be embodied in valves having different shaped outer configurations in accordance with the desire of the user.

FIG. 6 illustrates a third embodiment of a pressure balanced regulating valve made in accordance with the principles of the present invention. The parts of the embodiment of FIG. 6 which are the same as the embodiment of FIGS. 1 and 2 have been marked with the same reference numerals followed by the small letter *b*. The third embodiment of FIG. 6 is made with the disc cup 19*b* disposed in alignment with the pressurized fluid flow in a fluid system, in the same manner as the embodiment of FIGS. 3, 4 and 5. The only difference between the embodiment of FIG. 6 and the second embodiment of FIGS. 3, 4 and 5 is that the embodiment of FIG. 6 is provided with an exterior system for supplying high pressure fluid to the high pressure chamber 41*b*. A further difference is that the embodiment of FIG. 6 does not include a sensing guide probe 30 as included in the first two embodiments.

As shown in FIG. 6, high pressure fluid is bled into the high pressure chamber 41*b* through a pipe or conduit 70 which is threadably mounted in the bleed passage formed in the valve body 10b and which communicates ith the high pressure inlet passage 13b. The conduit ) is connected by a T-fitting 72 to the bleed conduit ib which is connected to the pilot 45 in the same manner as described for the first two embodiments, and which also connected to the passage 47b that communicates ith the high pressure chamber 41b. The embodiment of IG. 6 operates in the same manner as the first and second embodiment with the exception that the disc cup )b is guided solely by the guide arms 39b. The capacity : flow of conduit 70 is the same as bleed passage 34.

What is claimed is:

1. In a pressure balanced regulating valve for providing two stages of fluid flow in a fluid flow system, the combination comprising:
  (a) a valve body provided with an inlet passage and an outlet passage;
  (b) said passages being separated by a wall having a valve opening, with a valve seat around said opening for communicating said inlet passage with said outlet passage;
  (c) a valve member mounted in said outlet passage and movable between a closed position in seating engagement with said valve seat and an open position spaced apart from said valve seat to allow flow of fluid from the inlet passage to the outlet passage;
  (d) said valve member having a front end engageable with said valve seat and a rear end spaced apart longitudinally from said front end by an elongated structure having a closed outer surface, and said valve member further including an annular flange extended outwardly from said rear end so that the high pressure of the fluid passing through the valve seat will dissipate itself to the low pressure in the outlet passage before reaching said annular flange;
  (e) a hermetically sealed bellows in said valve body having one end fixed and the other end attached to the rear face of the flange on the rear end of said valve member so as to enclose an internal transverse face area of the valve member which is larger than the external face area on the front end of the valve member that is exposed to the inlet passage through the opening in said wall;
  (f) a pilot valve;
  (g) a first fluid conduit means communicating said inlet passage with the interior of said bellows and one side of said pilot valve;
  (h) a second fluid conduit means communicating said outlet passage with the other side of the pilot valve and having a flow capacity larger than the flow capacity of said first fluid conduit means, whereby fluid under pressure will flow from the inlet passage into the bellows to provide a holding force on the valve member which is greater than the force exerted on the valve member by the pressurized fluid in the inlet chamber and when said pilot valve is activated a first stage of fluid flow will be initiated and fluid will pass from said inlet passage through said first and second fluid conduit means and said pilot valve into said outlet passage, said first stage of fluid flow continuing until the flow of fluid out of the second fluid conduit means into the outlet passage exceeds the flow of fluid passing from said inlet passage into said first conduit means whereby the holding force in the bellows will decrease and the force exerted on the valve member by the pressurized fluid in the inlet passage will move the valve member to the open position to initiate a second stage of full fluid flow through the regulating valve which continues until the pilot valve is deactivated whereby the flow through the first stage is terminated and the holding force in the bellows increases and moves the valve member to the closed position; and,
  (i) said bellows being connected to the rear face of said flange so as to provide an area for engagement by fluid which is equal to the area engageable by fluid on the front face of the flange.

2. A pressure balanced regulating valve as defined in claim 1, including:
  (a) guide means for guiding the movements of said valve member between said closed and open positions.

3. In a pressure balanced regulating valve for providing two stages of fluid in a fluid flow system, the combination comprising:
  (a) a valve body provided with an inlet passage and an outlet passage;
  (b) said passages being separated by a wall having a valve opening, with a valve seat around said opening for communicating said inlet passage with said outlet passage;
  (c) a valve member mounted in said outlet passage and movable between a closed position in seating engagement with said valve seat and an open position spaced apart from said valve seat to allow flow of fluid from the inlet passage to the outlet passage;
  (d) said valve member having a front end engageable with said valve seat and a rear end spaced apart longitudinally from said front end by an elongated structure having a closed outer surface, and said valve member further including an annular flange extended outwardly from said rear end so that the high pressure of the fluid passing through the valve seat will dissipate itself to the low pressure in the outlet passage before reaching said annular flange;
  (e) a hermetically sealed bellows in said valve body having one end fixed and the other end attached to the rear face of the flange on the rear end of said valve member so as to enclose an internal transverse face area of the valve member which is larger than the external face area on the front end of the valve member that is exposed to the inlet passage through the opening in said wall;
  (f) a pilot valve;
  (g) a first fluid conduit means communicating said inlet passage with the interior of said bellows and one side of said pilot valve;
  (h) a second fluid conduit means communicating said outlet passage with the other side of the pilot valve and having a flow capacity larger than the flow capacity of said first fluid conduit means, whereby fluid under pressure will flow from the inlet passage into the bellows to provide a holding force on the valve member which is greater than the force exerted on the valve member by the pressurized fluid in the inlet chamber, and when said pilot valve is activated a first stage of fluid flow will be initiated and fluid will pass from said inlet passage through said first and second fluid conduit means and said pilot valve into said outlet passage, said first stage of fluid flow continuing until the flow of fluid out of the second fluid conduit means into the outlet passage exceeds the flow of fluid passing from said inlet passage into said first conduit means whereby the holding force in the bellows will decrease and the force exerted on the valve member by the pressurized fluid in the inlet passage will move the valve member to the open position to initiate a second stage of full fluid flow through the regulating valve which continues until the pilot valve is deactivated whereby the flow through the first stage is terminated and the holding force in the bellows increases and moves the valve member to the closed position;
  (i) said bellows being connected to the rear face of said flange so as to provide an area for engagement by fluid which is equal to the area engageable by fluid on the front face of the flange;
  (j) guide means for guiding the movements of said valve member between said closed and open positions;

(k) said guide means including,
  (1) a plurality of slots in said valve body; and,
  (2) a plurality of guide arms on said valve member slidably mounted in said slots.

4. A pressure balanced regulating valve as defined in claim 2, wherein:
  (a) said guide means includes a guidepost fixed in said valve body and extended through said valve member into said inlet passage.

5. A pressure balanced regulating valve as defined in claim 4, wherein:
  (a) said first fluid conduit means includes a passage through said guidepost and a passage communicating the interior of said bellows with said one side of said pilot valve.

6. A pressure balanced regulating valve as defined in claim 1, wherein:
  (a) said member is disposed for movement between said open and closed positions along an axis perpendicular to the direction of flow through the regulating valve.

7. A pressure balanced regulating valve as defined in claim 1, wherein:
  (a) said member is disposed for movement between said open and closed positions along an axis aligned with the direction of flow through the regulating valve.

8. A pressure balanced regulating valve as defined in claim 1, wherein:
  (a) said first fluid conduit means includes a conduit disposed exterior to the valve body and communicating with said inlet passage, said one side of said pilot valve, and said one end of said bellows.

References Cited

UNITED STATES PATENTS

| | | | |
|---|---|---|---|
| 1,048,228 | 12/1912 | Sutherland | 251—4 |
| 1,814,530 | 7/1931 | Spence | 137—48 |
| 2,630,831 | 3/1953 | Arnold | 251—46 |
| 2,687,868 | 8/1954 | Barrett et al. | 251—46 |
| 3,316,731 | 5/1967 | Quick | 251—33 |
| 3,346,004 | 10/1967 | Costello | 251—46 |

FOREIGN PATENTS 364,134  10/1962  Switzerland.

ARNOLD ROSENTHAL, Primary Examiner

U.S. Cl. X.R.

137—491; 251—46